March 14, 1967     R. E. KINNEY     3,309,045

FLYING WING

Filed Jan. 11, 1965     2 Sheets-Sheet 1

INVENTOR.
RAYMOND E. KINNEY
BY Knox & Knox

March 14, 1967  R. E. KINNEY  3,309,045
FLYING WING
Filed Jan. 11, 1965  2 Sheets-Sheet 2
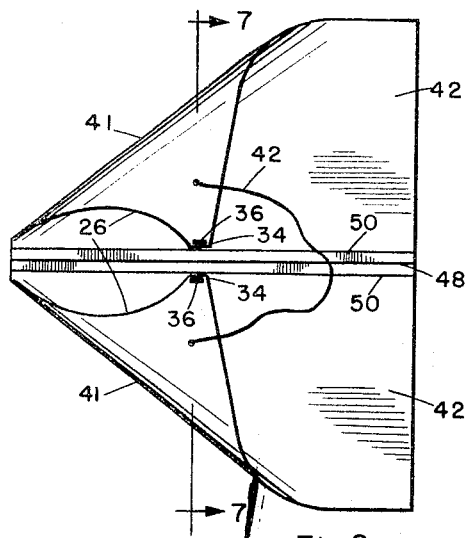
Fig. 6
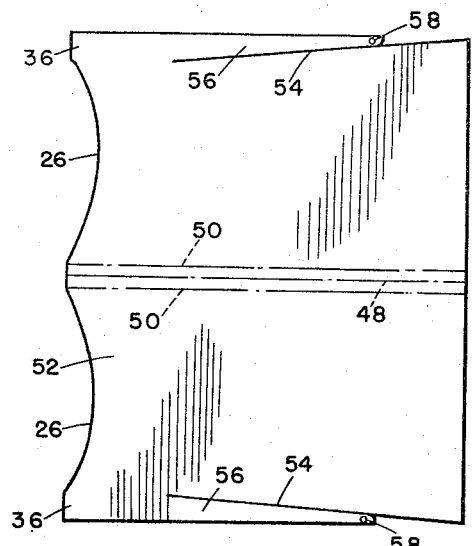
Fig. 8
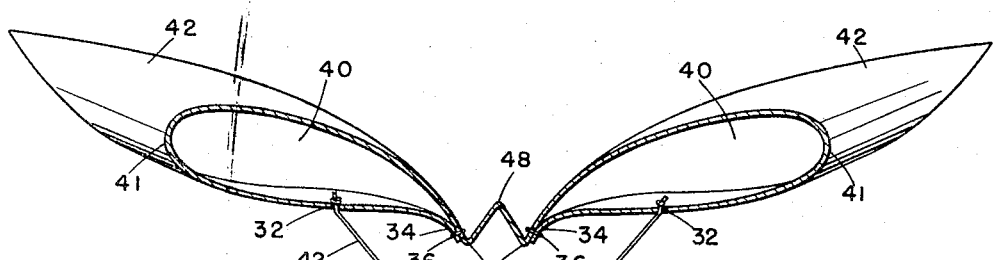
Fig. 7
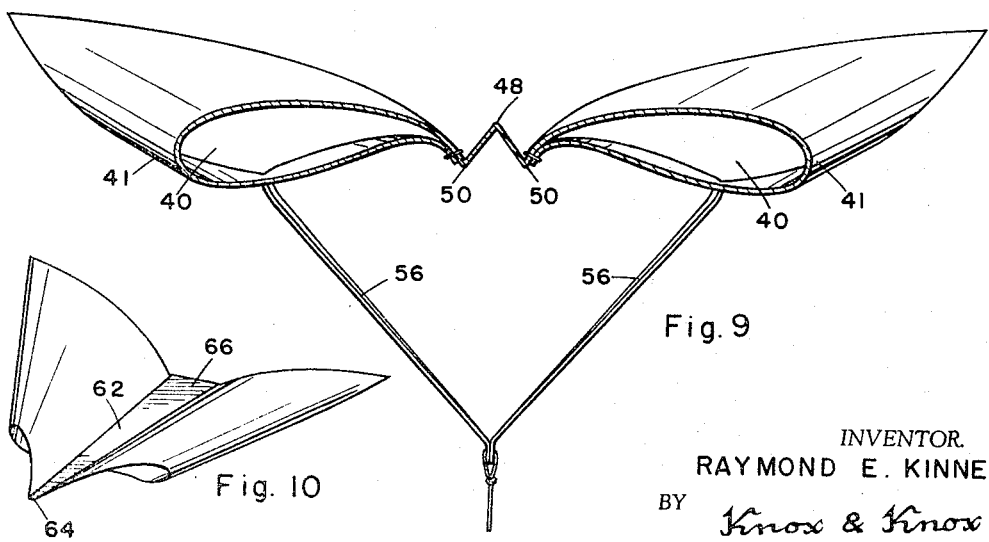
Fig. 9
Fig. 10
INVENTOR.
RAYMOND E. KINNEY
BY  Knox & Knox

United States Patent Office 3,309,045
Patented Mar. 14, 1967

3,309,045
FLYING WING
Raymond E. Kinney, 12171 Gilbert,
Garden Grove, Calif. 92641
Filed Jan. 11, 1965, Ser. No. 424,659
9 Claims. (Cl. 244—153)

The present invention relates to kites, soar planes gliders and the like and more specifically to a flying wing, powered or unpowered.

The primary object of this invention is to provide a flying wing which can be flown as a kite, glider, or soar plane and which is very stable with high lift characteristics due to a novel tunnelled airfoil configuration.

Another object of this invention is to provide a flying wing which can, in small sizes, be made from a single sheet of material by simple folding, no frame being required.

Another object of this invention is to provide a flying wing which is aerodynamically self-aligning under varying air loads when used as a kite, glider, soar plane, or powered craft.

The invention consists in the novel configuration as described in the specification, defined in the claims and illustrated in the drawings, in which:

FIGURE 6 is a bottom plan view of a modified form of the wing of FIGURE 4;

FIGURE 7 is an enlarged sectional view taken on line 7—7 of FIGURE 6;

FIGURE 8 is a plan view of a blank for a wing with integral kite harness;

FIGURE 9 is a sectional view similar to FIGURE 7, but showing the wing folded from the blank of FIGURE 8; and FIGURE 10 is a perspective view of a further modified form of the wing.

Similar characters of reference indicate similar or identical elements and portions throughout the specification and throughout the views of the drawing.

Basic wing

Figure 1:
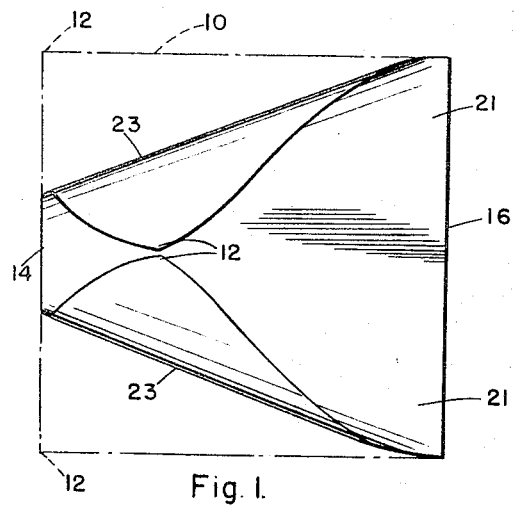
FIGURE 1 is a plan view showing the basic form of the wing folded from a blank sheet.
Figure 2:
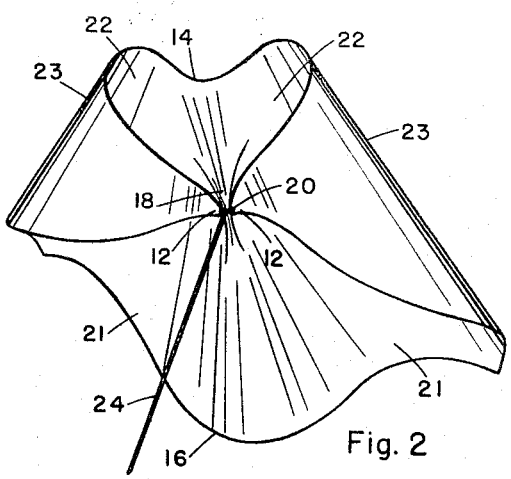
FIGURE 2 is a perspective view, from below, of the wing in use as a kite.

The basic wing is formed from a single rectangular blank 10 of sheet material, such as paper, plastic, plywood, metal or the like depending on size and other considerations. The rectangular form is the most convenient, but it is not essential to use a true rectangle. Two corners 12 of the blank are folded or rolled inwardly to meet at the center of the blank at a point spaced from the edge between the corners which will become the leading edge 14, the opposite edge being undisturbed and becoming the trailing edge 16. The construction is well illustrated in the drawings where, by way of example, paper or the like material is employed. The central portion of blank where corners 12 are brought together is creased, as indicated at 18 in FIGURE 2, and the corners are secured to the crease by a clip 20 of suitable type. A small metal clip, staple, or other fastener can be used, or a piece of thread may be tied through the several thicknesses of material. As will be apparent from FIGURE 2, the wing thus formed will be folded upwardly generally along a longitudinal axis which need not be sharply creased along its full length but can be left naturally rounded as illustrated, with the main panel portions 21 of the wing extending on each side. The leading edge 14 turns downwardly and inwardly on either side and sweeps rearwardly to define the openings of a pair of tunnels 22 formed by the folded forward portions of the blank which are smoothly rolled along the swept back outer portions 23.

A string, line, or cable 24 can be attached to or at the location of clip 20, so that the wing can be flown as a kite or towed as a glider. This form of wing can be made very rapidly from a sheet of writing paper, even from the light grade known as onion skin. It has been found that a light paper or wing of this type will fly out to several hundred feet on a light line without tearing or breaking away. Large wings would, of course, require correspondingly heavier material to support itself in the required shape.

Modified forms

Figure 3:
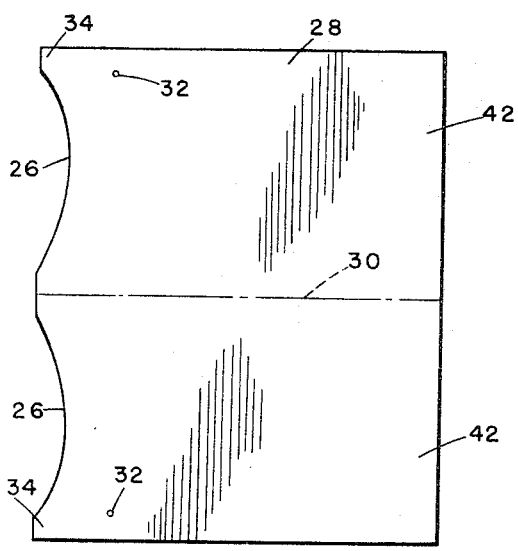
FIGURE 3 is a plan view of a blank for an alternative form of wing.
Figure 4:
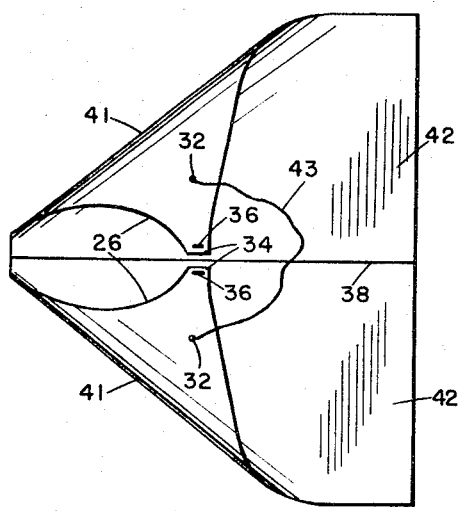
FIGURE 4 is a bottom plan view of a wing folded from the blank of FIGURE 3.
Figure 5:
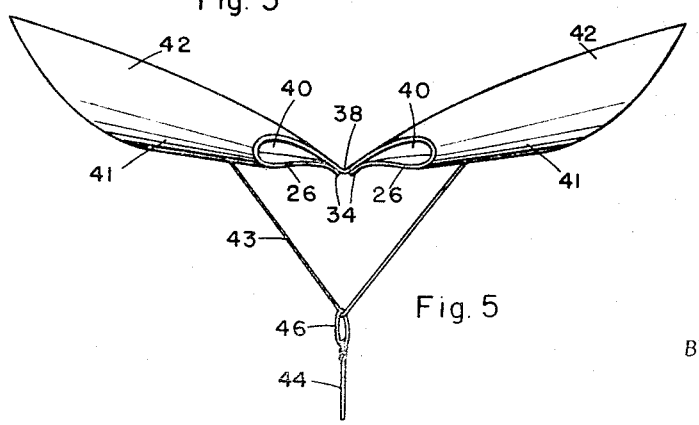
FIGURE 5 is a front view of the wing of FIGURE 4, with a self-centering kite harness.

The wing may be refined in appearance and performance, as illustrated in FIGURES 3–5, by cutting concave leading edge portions 26 in one edge of a blank 28 and folding the blank at least some distance along a longitudinal center line, indicated on the blank at 30. Small holes 32 are punched rearwardly of the leading edges and inwardly from the sides of the blank. The leading edge corners 34 are folded or rolled inwardly and rearwardly and secured in any suitable manner on opposite sides of the central crease, as by clips 36, as in FIGURE 4, the crease providing longitudinal stiffness and becoming a keel 38. It will be noted that the concave leading edge portions 26 effectively enlarge the openings to the tunnels 40 formed in the wing and increase the air flow. The material should be chosen according to the size and use of the wing, so that the rolled or folded outer portions 41 of the tunnels 40 hold a smooth natural curvature, in this instance, and ensure that the tunnels remain open, while the rear panel portions 42 have sufficient stiffness to extend unsupported on each side.

A bridle 43 of line, thread or cable is secured between holes 32, which are now spaced on opposite sides of keel 38, the ends being secured by knots, toggles, or any suitable retaining means. A line 44 may be attached to bridle 43 by a ring 46.

The wing illustrated in FIGURE 6 is similar to that of FIGURE 4 except that the longitudinal keel is formed by a downwardly folded central crease 48 and two upwardly folded creases 50, providing a keel of W-shaped or M-shaped cross section as in FIGURE 7 rather than a simple V-shape. This arrangement increases longitudinal stiffening and allows more flexibility of the wing in adjusting itself to varying air loads in flight.

A further modified form, illustrated in FIGURES 8 and 9, incorporates the bridle into the blank itself. The blank 52 has the concave leading edge portions 26 and a keel formed by creases 48 and 50, as described above, but the sides of the blank are longitudinally slit. In these figures the slits 54 extend forwardly from adjacent the trailing edge to points near the leading edge and form elongated bridle arms 56 having marked positions or holes 58 at the rear ends thereof. When the wing is folded into finished form, a line 60 may be threaded through holes 58 and the bridle arms 56 are brought together beneath the wing as in FIGURE 9.

A further form of the wing, illustrated in FIGURE 10, is also formed from a rectangular blank but differs in that some part of the keel 62 is substantially flat and tapers from a narrow leading end 64 to a wide trailing end 66. Points 64 and 66 need not extend to the forward and rear extremities.

Various other folding or creasing configurations may be used, depending on the proportions of the wing and the material used.

*General characteristics*

These herein disclosed types of the flying wing are very stable and, due to resilience and flexibility, tend to adjust to varying air loads without oscillation. The tunnelled airfoil configuration produces high lift and requires a minimum airflow speed to lift the wing. It has been found that when used as a kite, the wing will rise very rapidly both in very light and fairly stiff breezes. Riding thermals on breezeless days it has flown hundreds of feet overhead.

The proportions of the wing can vary considerably while still maintaining the tunnelled airfoil formed by turning in the front corners. For instance, the distance from the leading edge to the point of attachment of the corners at the keel may vary from 25 to 75 percent of the overall length. A mid-range of 40 to 50 percent will be suitable for most conditions but the extremes may be used to adapt the wing to particular loads or air conditions. Changes in the attachment position will vary the sweep-back angle of the wing and tunnel entry size.

The length and width of the blank may vary to produce a wing of high aspect ratio or low aspect ratio. As illustrated, the length of the blank is about four-fifths of its width and this has been found to be a particularly efficient configuration. Either the line bridle or the integral bridle arms may be used with any of the forms of the wing.

When used as a free flying wing or glider, it may be necessary to use a small amount of ballast at the forward end of the wing but this will depend on the aspect ratio and the material used. In variable air flow conditions such as gusty winds, the wing tends to flex on opposite sides of the keel and adjust itself to existing loads without becoming unstable.

While the wing is described as made from a single sheet of material, it will be obvious that large sizes may be built up from small sections or parts with or without frame or braces, or with inflatable portions. The structure as here shown is self-supporting and needs no struts or bracing wires.

In the interest of facility in storage and transportation, the wings may be folded flat, which involves the hinging or creasing of the wings to define certain portions of the tunnels.

It is understood that other minor variations from the form of the invention disclosed herein may be made without departure from the spirit and scope of the invention, and that the specification and drawings are to be considered as merely illustrative rather than limiting.

I claim:
1. A flying wing, comprising:
a central portion;
lifting panels extending on opposite sides of said central portion;
said wing having longitudinally extending airflow conducting tunnels integral with the forward portions of said panels to conduct airflow over the panels; and
the major portions of said lifting panels extending rewardly immediately behind said tunnels.

2. A flying wing, comprising:
a central keel;
lifting panels extending on opposite sides of said keel;
said wing having longitudinally extending airflow conducting tunnels below the forward portions of said lifting panels; and the major portions of said lifting panels extending rearwardly immediately behind said tunnels.

3. A flying wing, comprising:
a sheet of flexible material having sufficient stiffness to hold its shape when folded;
said sheet having a forward end;
spaced portions of said forward end being folded toward each other and secured to the central portion of said sheet rearwardly of the forward end, the folded portions being smoothly rolled and defining longitudinally extending airflow conducting tunnels.

4. A flying wing according to claim 3 and including means adjacent the point of securement of said spaced portions for attachment of a line for towing and tethering the wing.

5. A flying wing, comprising:
a sheet of flexible material having sufficient stiffness to hold its shape when folded;
said sheet having a forward end and a longitudinally creased central keel;
and spaced portions of said forward end being folded toward each other and secured to opposite sides of said keel rearwardly of the forward end, the folded portions being smoothly rolled and defining longitudinally extending airflow conducting tunnels on opposite sides of said keel.

6. A flying wing according to claim 5 and including bridle means extending from said spaced portions adjacent their points of securement on opposite sides of said keel for attachment of a line for towing and tethering the wing.

7. A flying wing, comprising:
a sheet of flexible material having sufficient stiffness to hold its shape when folded;
said sheet having a forward end with concave leading edge portions, and a folded central keel;
the laterally opposed outer portion of said forward end being folded inwardly and secured to opposite sides of said keel rearwardly of the forward end, the folded portions being smoothly rolled and forming longitudinally extending airflow conducting tunnels with said concave leading edges defining the open forward ends of the tunnels.

8. A flying wing, comprising:
a sheet of flexible material having sufficient stiffness to hold its shape when folded;
said sheet having a forward end with concave leading edge portions, and a longitudinally creased central keel;
the laterally opposed outer portions of said forward end being folded inwardly and secured to opposite sides of said keel rearwardly of the forward end, the folded portions being smoothly rolled and forming longitudinally extending airflow conducting tunnels with said concave leading edges defining the open forward ends of the tunnels;
the laterally opposed edges of said sheet having integral elongated arms to extend from the folded wing and form a bridle for attachment of a line for towing and tethering the wing.

9. A flying wing, comprising:
a sheet of flexible material having sufficient stiffness to hold its shape when folded;
said sheet having a forward end with concave leading edge portions, and a longitudinally creased central keel;

the rear portions of said sheet being lifting panels extending on opposite sides of said keel;

the laterally opposed outer portions of said forward end being folded inwardly below said lifting panels and secured on opposite sides of said keel rearwardly of the forward end, the folded portions being smoothly rolled and forming longitudinally extending airflow conducting tunnels to conduct airflow below said lifting panels;

said concave leading edge portions defining the open forward ends of said tunnels.

References Cited by the Examiner

UNITED STATES PATENTS

| | | | |
|---|---|---|---|
| 464,412 | 12/1891 | Ansboro | 244—153 |
| 2,118,052 | 5/1938 | Odor | 244—15 |

FOREIGN PATENTS

| | | |
|---|---|---|
| 23,493 | 1906 | Great Britain. |

MILTON BUCHLER, Primary Examiner.

ALFRED E. CORRIGAN, Examiner.